US012755023B2

(12) United States Patent
Bonnefoy-Claudet et al.

(10) Patent No.: US 12,755,023 B2
(45) Date of Patent: *Oct. 6, 2026

(54) NON-INTRUSIVE METHOD OF DETECTING SECURITY FLAWS OF A COMPUTER PROGRAM

(71) Applicant: Cryptosense SAS, Paris (FR)

(72) Inventors: Bertrand Bonnefoy-Claudet, Paris (FR); Etienne Millon, Paris (FR); Nathan Rebours, Paris (FR); Graham Steel, Paris (FR)

(73) Assignee: Cryptosense SAS, Paris (FR)

( * ) Notice: Subject to any disclaimer, the term of this patent is extended or adjusted under 35 U.S.C. 154(b) by 74 days.

This patent is subject to a terminal disclaimer.

(21) Appl. No.: 18/814,273

(22) Filed: Aug. 23, 2024

(65) Prior Publication Data

US 2024/0419810 A1 Dec. 19, 2024

Related U.S. Application Data

(63) Continuation of application No. 18/228,634, filed on Jul. 31, 2023, now Pat. No. 12,105,809, which is a (Continued)

(30) Foreign Application Priority Data

Jun. 9, 2017 (FR) ....................................... 1755151

(51) Int. Cl.

*G06F 21/57* (2013.01)
*G06F 8/61* (2018.01)

(Continued)

(52) U.S. Cl.

CPC ........ *G06F 21/577* (2013.01); *G06F 11/3612* (2013.01); *G06F 21/54* (2013.01); *G06F 8/61* (2013.01); *G06F 2221/033* (2013.01)

(58) Field of Classification Search

CPC .. G06F 21/52; G06F 11/3466; G06F 11/3636; G06F 11/3476; G06F 11/34;

(Continued)

(56) References Cited

U.S. PATENT DOCUMENTS

| | | | |
|---|---|---|---|
| 7,207,065 | B2 | 4/2007 | Chess et al. |
| 8,844,043 | B2 | 9/2014 | Williams et al. |

(Continued)

FOREIGN PATENT DOCUMENTS

| | | | | |
|---|---|---|---|---|
| WO | WO-2016036368 A1 * | 3/2016 | ........... | G06F 21/577 |
| WO | WO-2016047111 A1 * | 3/2016 | ............... | H04L 9/14 |
| WO | WO-2016094840 A2 * | 6/2016 | ......... | G06F 9/45558 |

OTHER PUBLICATIONS

Chatzikonstantinou et al, "Evaluation of Cryptography Usage in Android Application" Proceedings of the 9th EAI International Conference of Bio-Inspired Information and Communications Technologies, Jan. 1, 2016, 8 pages.

(Continued)

*Primary Examiner* — Tae K Kim

(74) *Attorney, Agent, or Firm* — Fish & Richardson P.C.

(57) ABSTRACT

This disclosure relates to a non-intrusive method of detecting security flaws of a computer program APP. The method comprises a step of installing and executing an executable and non-instrumentalized version of the program APP in a computer system 1, the computer system 1 comprising at least one cryptographic function able to be called by the program APP. It also comprises, in the course of the execution of the program, a step of recording in a tracing file the modalities of calls to the cryptographic function and, after the execution of the program, a step of analyzing the tracing file so as to devise a data structure of the states taken by the cryptographic object manipulated in the course of the execution of the program. The data structure is analyzed to detect (Continued)

calls to the cryptographic function that are liable to form a security flaw.

20 Claims, 1 Drawing Sheet

Related U.S. Application Data continuation of application No. 16/620,819, filed as application No. PCT/FR2018/051162 on May 11, 2018, now Pat. No. 11,768,944.

(51) Int. Cl.
*G06F 11/3604* (2025.01)
*G06F 21/54* (2013.01)

(58) Field of Classification Search
CPC ................. G06F 11/301; G06F 11/302; G06F 2221/2149; G06F 2221/0737; G06F 2221/033; G06F 2221/034
See application file for complete search history.

(56) References Cited

U.S. PATENT DOCUMENTS

| | | | | |
|---|---|---|---|---|
| 9,438,618 | B1 * | 9/2016 | Sultan | G06F 21/53 |
| 9,898,385 | B1 * | 2/2018 | O'Dowd | G06F 11/3476 |
| 10,558,809 | B1 * | 2/2020 | Joyce | G06N 5/046 |
| 10,701,097 | B2 * | 6/2020 | Madou | G06F 11/3692 |
| 10,831,639 | B2 * | 11/2020 | Gliwa | G06F 11/3471 |
| 2003/0200451 | A1 * | 10/2003 | Evans | G06F 21/85 713/193 |
| 2004/0230825 | A1 * | 11/2004 | Shepherd | G06F 21/6209 715/738 |
| 2009/0031135 | A1 * | 1/2009 | Kothandaraman | G06F 21/64 713/176 |
| 2011/0072517 | A1 * | 3/2011 | Tripp | G06F 11/3636 726/25 |
| 2011/0072917 | A1 | 3/2011 | Lautala et al. | |
| 2011/0228926 | A1 * | 9/2011 | Shumow | H04L 9/003 380/1 |
| 2011/0231936 | A1 * | 9/2011 | Williams | G06F 21/577 726/25 |
| 2014/0095936 | A1 * | 4/2014 | Grawrock | G06F 11/3636 714/E11.02 |
| 2014/0165204 | A1 * | 6/2014 | Williams | G06F 21/55 726/25 |
| 2014/0181794 | A1 * | 6/2014 | Grawrock | G06F 11/36 717/128 |
| 2015/0058913 | A1 | 2/2015 | Kandasamy | |
| 2016/0300060 | A1 * | 10/2016 | Pike | G06F 21/52 |
| 2016/0378640 | A1 * | 12/2016 | Hron | G06F 8/52 717/130 |
| 2017/0315795 | A1 * | 11/2017 | Keller | G06F 11/3006 |
| 2017/0322877 | A1 * | 11/2017 | Chan | G06F 11/3037 |
| 2018/0046802 | A1 | 2/2018 | Pyles | |
| 2019/0102279 | A1 * | 4/2019 | Awan | G06F 9/4486 |
| 2019/0171846 | A1 * | 6/2019 | Conikee | G06F 21/6245 |
| 2019/0303584 | A1 * | 10/2019 | Yang | G06F 7/02 |
| 2019/0354690 | A1 * | 11/2019 | Brigandi | H04W 12/126 |

OTHER PUBLICATIONS

International Search Report for International Application No. PCT/FR2018/051162 dated Jul. 26, 2018, 3 pages.
International Written Opinion for International Application No. PCT/FR2018/051162 dated Jul. 26, 2018, 8 pages.
Li et al., "iCryptoTracer: Dynamic Analysis on Misuse of Cryptography Functions in iOS Applications," Network and Parallel Computing; Springer International Publishing, Oct. 15, 2014, pp. 349-362.

* cited by examiner

NON-INTRUSIVE METHOD OF DETECTING SECURITY FLAWS OF A COMPUTER PROGRAM

CROSS-REFERENCE TO RELATED APPLICATIONS

This application is a continuation of U.S. patent application Ser. No. 18/228,634, filed Jul. 31, 2023, which is a continuation of U.S. patent application Ser. No. 16/620,819, filed Dec. 18, 2019, which is a national phase entry under 35 U.S.C. § 371 of International Patent Application PCT/FR2018/051162, filed May 11, 2018, designating the United States of America and published as International Patent Publication WO 2018/224747 A1 on Dec. 13, 2018, which claims the benefit under Article 8 of the Patent Cooperation Treaty to French Patent Application Serial No. 17/55151, filed Jun. 9, 2017. The entire contents of the above-disclosures are incorporated herein by reference.

TECHNICAL FIELD

This disclosure relates to a non-intrusive method of detecting security flaws of a computer program.

BACKGROUND

An increasing number of computer programs manipulate data that must be kept secret or perform transactions that must be secured. This is the case for computer programs processing, for example, personal data, such as health data, or carrying out financial transactions, such as account-to-account transfers.

To ensure the secrecy, authenticity and/or security of the data manipulated, it is customary to use cryptographic techniques. This can be done, for example, by encrypting the content of a message using an encryption key. Only the key holder is therefore able to access this content.

In a computer system, the cryptographic functions are generally grouped together in a standard and proven library. This library can be part of the operating system and be available for access to all applications running on that system.

Cryptographic techniques, although widely used, have limitations. For example, if the encryption key is too short in length, it may be possible to have a "brute force" access to the content of an encrypted message, by trying all possible key combinations in the course of successive attempts to decrypt the message.

In addition, and although great care is taken when designing the cryptographic function libraries, they may have flaws that can be exploited by third parties to access reserved information or perform fraudulent transactions. When such a flaw is identified by the IT community, it is immediately communicated so that an improved version of the library can be made available or the rules for the proper use of the functions can be updated.

Despite all the measures taken, it is not possible to be certain that a computer program does not contain security flaws. One of the reasons for this is the modular approach to program design. The modules constituting this program may be developed by different individuals or groups of individuals within the same organization, other modules may be developed by third-party organizations, or may be made available by the IT community in the form of so-called "open source" modules. This modular approach to designing and reusing pre-existing modules makes it easier to design and build computer programs, but makes it particularly difficult to apply a strict security policy that guarantees a completely flawless design.

Several technical approaches have therefore been proposed to test programs to detect the presence of possible security flaws.

According to a first approach, known as "static" and, for example, from document U.S. Pat. No. 7,207,065 or document US20110072917, an analysis of a program in its source version is performed. This type of analysis presents the risk of not detecting certain flaws that are present in the course of the execution of the program, which makes it vulnerable. Indeed, the behavior of a computer program, i.e., the precise sequence of events that follow each other when the executable version of the program is executed on the computer system, does not depend only on the content of its source version. For example, a program configuration file that is associated with the source version of the program only at the time of its compilation, or that is queried by the program in its executable form when it is started, may affect its behavior in the course of its execution and make the program vulnerable depending on the content of that configuration file.

Experience also shows that the static approach to detection leads to an excessive number of potential flaws being reported as alerts. Since the detection process cannot discriminate between potential flaws and proven flaws due to a lack of knowledge of the context wherein the program is executed, some of these alerts are false alarms.

In general, false alarms should be avoided, even if they can be easily identified and ruled out by the user. When they are provided in excessive numbers, they undermine the relevance of the detection method and lead its users to ignore all the alerts provided, even if they concern proven flaws.

According to another detection approach, known as "dynamic" and known, for example, from U.S. Pat. No. 8,844,043, the program is used in its executable version using tracing points ("tracepoint" is commonly used). When a tracepoint is reached in the course of the execution of the program, a call is made to a probe function, allowing certain information about the status of the program at the time of the call to be transferred to a tracing file. The tracing file can be analyzed to detect behaviors liable to form security flaws. In a variant of this approach, for example, known from the article "Evaluation of Cryptography usage in Android application" by A. Chatzikonstantinou et al, proceedings of the 9th EAI international conference on bioinspired information and communications technologies of Jan. 1, 2016, the program is executed in a debugging environment, different from the production environment wherein the program is intended to run.

However, the known dynamic detection approaches are not entirely satisfactory, as they require the introduction of tracepoints in the executable version of the program and the execution of the second function. However, it is not always possible to use a program in this way, for example, because the program in its source version is not available or because the usage rights associated with this program do not allow its modification. In addition, this instrumentalization or execution in a debugging environment can affect the dynamic behavior of the program, which can lead to some security flaws being undetectable. The tracing information collected is not representative of the natural operation of the program.

From the document "iCryptoTracer: Dynamic Analysis on Misuse of Cryptography functions in iOS Applications" by Li Yong and Al, Network and Parallel computing, Springer international publishing, Cham, pp 349-362, dated 15 Oct. 2014, is known a method for detecting security flaws in a program. According to this document, some parameters for calls to the cryptographic functions are recorded. These parameters are analyzed to detect three types of potential security flaws. The solution provided by this document only allows to identify a limited number of flaws.

This disclosure is intended to compensate for all or part of the above-mentioned disadvantages. In particular, it aims to provide a particularly reliable method for detecting security flaws in a computer program, i.e., to identify proven security flaws in the program and to limit false alarms as much as possible.

BRIEF SUMMARY

To reach one of these goals, an object of this disclosure is to provide a non-intrusive method of detecting security flaws of a computer program, with the method comprising the following steps:

- Installing and executing an executable and non-instrumentalized version of the program in a computer system, the computer system including at least one cryptographic function able to be called by the program to manipulate at least one cryptographic object;
- in the course of the execution of the program, recording in a tracing file the modalities of calls to the cryptographic function;
- after the execution of the program, analyzing the tracing file to devise a data structure of the states taken by the cryptographic object manipulated in the course of the execution of the program, and analyzing the data structure to detect calls to the cryptographic function that are liable to form a security flaw.

By recording in a tracing file the modalities of calls to a cryptographic function, the necessary information is available to identify the uses of this cryptographic function that is liable to form a potential security flaw. It is therefore not necessary to instrumentalize the program, to choose the location of tracepoints, or even to have the source version of this program to test it. Analyzing the states taken by the cryptographic object in the course of the execution of the program and the transition between these states makes it possible to identify flaws that would not be apparent from the simple "static" analysis of the tracing file.

According to other advantageous and not restrictive characteristics of this disclosure, taken either separately or in combination:

- the recording in a tracing file is implemented by a tracing program running concurrently with the computer program;
- the cryptographic function is instrumentalized to allow the recording of its modalities of call;
- the method includes a preliminary step of replacing an original cryptographic function of the computer system by the instrumentalized cryptographic function;
- recording includes obtaining at least a part of the execution stack when the cryptographic function is called by the program;
- the system includes a plurality of cryptographic functions and only the modalities of call to the management and usage cryptographic functions are recorded in the tracing file;
- the modalities of call to the cryptographic recorded in the tracing file include at least one of the modalities selected from the group consisting of the name of the cryptographic function, the arguments of the cryptographic function, the name of a module calling the cryptographic function, the time-stamping of the call to the cryptographic function, and the response returned by the cryptographic function;
- at least one of the modalities of call to the cryptographic function is a data pointer, and the recording step includes accessing the data designated by the pointer to record it in the tracing file;
- the analysis of the data structure includes the application of a rule database;
- the analysis step implements an inference engine;
- the method includes a step of recording the version number of the cryptographic function;
- the method includes a step of filtering the detected security flaws.

This disclosure also relates to a computer program comprising instructions adapted to the implementation of each of the steps of the non-intrusive method of detecting security flaws of a computer program, when the program is executed on a computer.

BRIEF DESCRIPTION OF THE DRAWINGS

This disclosure will be better understood upon reading the following description of the specific although not restrictive embodiments of this disclosure and while referring to the appended figures wherein.

DETAILED DESCRIPTION

Figure 1:
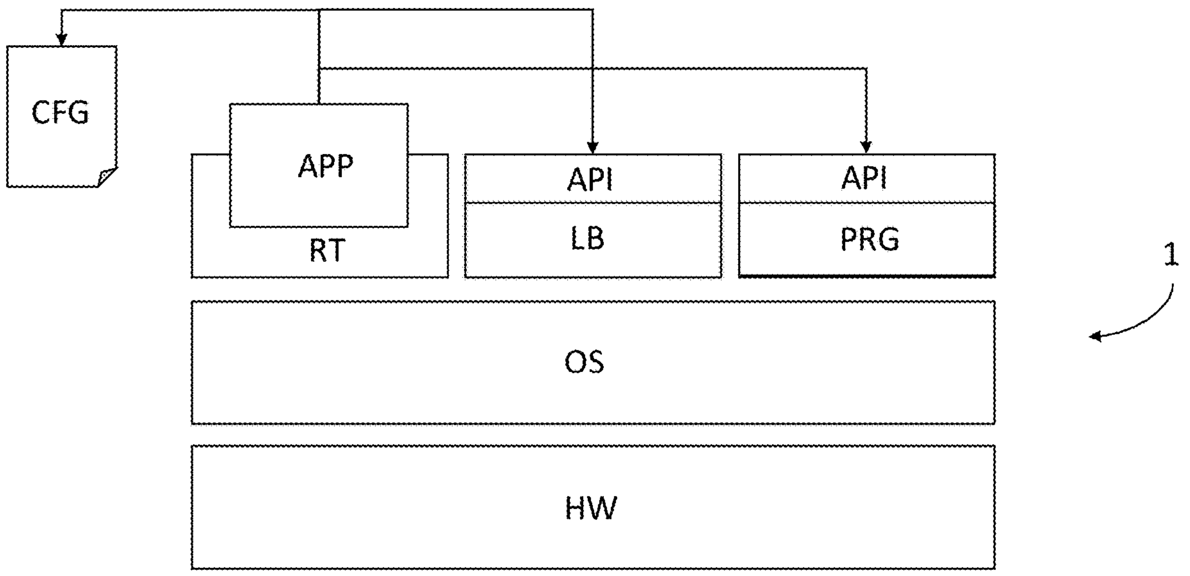
FIG. 1 represents a computer system for the implementation of at least part of the present disclosure.

FIG. 1 shows a simplified and schematic representation of a computer system 1 for executing an application or a program. The computer system 1 defines the production environment wherein an application APP is to run.

This system includes a hardware platform HW. It can be a computer, a server, or generally a computing device or a plurality of computing devices interconnected with each other, such as a mobile phone or a tablet connected to a server.

The hardware platform HW is equipped with an operating system OS or a plurality of such systems if the hardware platform HW consists of a plurality of heterogeneous computing devices. In the latter case, the operating systems may be the same or different from each other.

For the purpose of this application, a collection of instructions linked together and forming a program that runs on a single computing device will be referred to as an "application" or a "program," although this program can be interfaced and communicate with other programs running on other computing devices to form a complete solution.

An application APP running on the hardware platform HW is materialized by an executable file that can be stored in one of the storage means of the system 1. The executable file can be derived from the compilation of the source form of the application, i.e., the form wherein the application was designed and expressed through a particular programming language. The application APP in its executable form may include an execution environment.

The hardware platform HW may include, for example, one or more computer-readable storage devices SD configured to store computing instructions, data, and other information (e.g., nonvolatile information) for use in the hardware platform HW. By way of example and not limitation, these computer-readable storage devices SD may include magnetic and/or optical storage devices, such as disk drives, magnetic tape, CDs (compact discs), DVDs (digital versatile discs or digital video discs), and semiconductor devices such as Random Access Memory (RAM), Dynamic RAM (DRAM), Synchronous RAM (SRAM), Read-Only Memory (ROM), Erasable Programmable ROM (EPROM), Flash memory, and other equivalent computer-readable storage devices SD. The term "computer-readable storage device," shall be interpreted to exclude transitory signals.

The hardware platform HW may also include, for example, one or more processors PR configured to execute a wide variety of operating systems OS and applications APP, including computing instructions for detecting security flaws of programs in accordance with the present disclosure. The one or more processors PR may be configured as, for example, a microprocessor, controller, microcontroller, or state machine suitable for carrying out processes of the present disclosure. The processor(s) PR may also be implemented as a combination of computing devices, such as a combination of a Digital Signal Processor (DSP) and a microprocessor, a plurality of microprocessors, one or more microprocessors in conjunction with a DSP core, or any other such configuration.

RT, integrated into the executable program at the time of its compilation. Alternatively, the execution environment RT may be separate from the application in its executable form, with this execution environment RT then forming an intermediate layer between the hardware platform HW, the operating system OS and the application APP. In all cases, the execution environment provides a certain degree of independence between the application APP itself and the hardware platform HW and/or the operating system OS, which the application APP is to run on. This execution environment RT can consist of a Java virtual machine, for example, or a standard functions library that can be integrated into the application at the time of its compilation.

An application APP can be configured by a configuration file CFG, saved on a storage means of the hardware platform HW. This setting does not require the application to be recompiled. Such a configuration file contains the values of the application parameters, which can be easily edited. In the course of the execution of the application, usually when it is started, it queries the configuration file to determine the value of its parameters.

The computer system 1 in FIG. 1 also includes a set of software functions LB, PRG liable to be called by applications running on the hardware platform. These functions can be part of the operating system or independent thereof. They can be grouped into a function library LB (a "Library" as generally used in English) containing executable code and in which an application is dynamically linked to in the course of its execution. The functions can also be implemented by other applications PRG liable to run on the hardware platform. In all cases, the application APP may use these functions through an application programming interface API or «Application Programing Interface».

In the case of this description, the computer system 1 includes at least one cryptographic function, and more generally a plurality of such functions.

For the sake of clarity, it is recalled that the cryptographic functions made accessible to an application provide a set of services to manipulate cryptographic objects and that can be distributed according to several categories:

Key management category: these are functions allowing the generation, storage, sharing of keys in different encoding/decoding formats, thus ensuring the secrecy or authenticity of a content;

Key operation category: these are the functions that effectively encrypt/decrypt, sign or verify the signature of a content. These functions may use other library functions, such as a function to generate a random number, which are also part of this category;

Purely informational category: these are functions to access information about the cryptographic functions themselves, such as their availability or installation status.

For example, the "open SSL" cryptographic library, available for many platforms and environments, and allowing to implement a large number of encryption methods (AES, DES . . . of cryptographic hashing functions (MD5, SHA-1 . . . ), and of public-private key cryptography protocols (RSA, DSA, . . . ) is known.

The "open SSL" library also provides functions implementing secure communication protocols, such as TSL ("Transport Security Layer") or SSL ("Secure Socket Layer"), which use the above cryptographic functions.

It should be noted in this regard that more generally, an application can use a cryptographic function directly or indirectly through the use of an intermediate function that itself uses a cryptographic function.

As stated in the introduction to this application, the proper use of cryptographic functions is intended to prevent the incorporation of security flaws into an application under development. The flaws, where they exist, may be used by a third party to access or alter information that should be kept confidential and/or honest. It is therefore important to be able to detect security flaws in an application before it goes into production in order to eliminate them. As mentioned too, there is no guarantee upon completion of the development phase that an application does not contain such flaws.

The purpose of this disclosure is therefore to propose a non-intrusive method for detecting security flaws in such an application.

Figure 2:
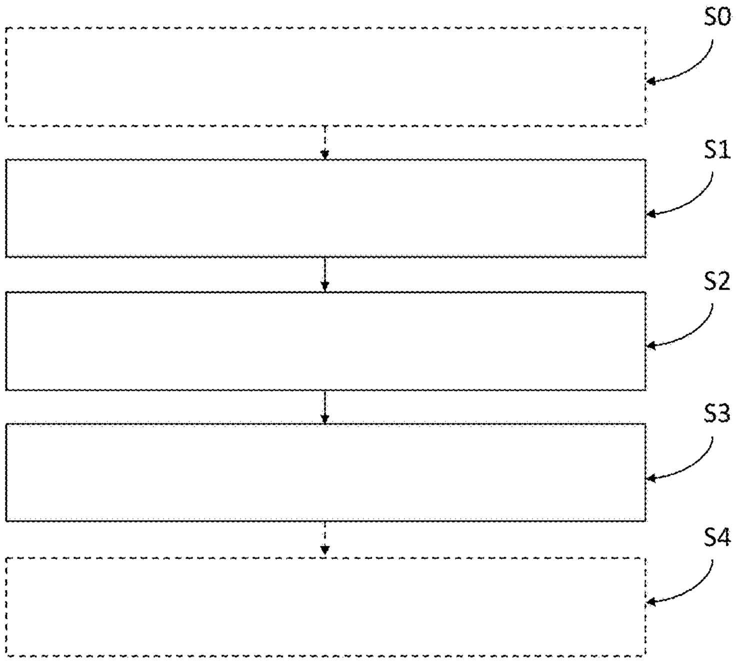
FIG. 2 represents the steps of a method of detection in accordance with this disclosure.

With reference to FIG. 2, a method according to this disclosure includes a first step IS wherein an executable, non-instrumentalized version of a program to be evaluated is installed and executed in a computer system.

"Not instrumentalized," means that the evaluated computer program APP is precisely the one that will be used in production. It is not equipped with any device, addition or specific code that would aim to detect security flaws or more generally to facilitate its debugging. This ensures that the program runs continuously under conditions that are completely identical with or similar to those it will encounter in its production environment. In other words, it is ensured that the sequence of instructions will be executed in the same or a very similar way in the course of the flaw detection process as in the course of its normal operation in production. It is not possible to execute the program to be evaluated in a debugging environment that would not allow this program to be executed uninterrupted and naturally. In addition, it is possible to implement the method without having the source version of the program and/or without having the rights to modify the available version of the program.

Advantageously, the computer system which the program APP is executed on in the course of the detection process has a hardware and software architecture that conforms to that described above in relation to FIG. 1, wherein the program is to run. Preferably, this architecture is identical to the architecture of the production computer system. This ensures that the execution of the program in the course of the detection process reproduces as accurately as possible its execution in the production environment. This avoids detecting flaws whose origin would be related to the test environment or making undetectable flaws whose origin would be related to the production environment.

A method according to this disclosure also includes a second step S2, subsequent to the first one, wherein, in the course of the execution of the program, the modalities of call to at least one cryptographic function available in the system are recorded in a tracing file. Preferably, and to make the method efficient, the modalities of call to a plurality of cryptographic functions are recorded.

Several approaches are possible to allow this recording.

According to a first approach, a tracing program, independent and distinct from the program tested, can run on the computer system in conjunction with the program tested. The tracing program can, for example, take the form of an agent that is activated by the operating system or by the execution environment of the program tested, when it accesses a cryptographic function available in the system, by calling an API. The agent, in the course of its execution, may record in the tracing file the modalities of call to each cryptographic function.

According to an alternative or complementary approach, the cryptographic functions themselves may be instrumentalized to record, at the time of their calls, the call modalities in the tracing file. Instrumentalizing the function can be done at the level of the function itself, at the level of a library of such functions or at the level of the interfaces allowing access to these functions. In this case, in a preliminary step S0 of the method, at least some of the original cryptographic functions (or libraries of cryptographic functions or interfaces for accessing these functions) will be replaced in the computer system by an instrumentalized version, i.e., with specific instructions for recording the call modalities in the tracing file.

During this recording step S2, for reasons of efficiency, the aim is to record the call information in the tracing file to the extent necessary. Thus, in a very advantageous way, no information is recorded when the cryptographic function called is of an informational nature only. In other words, only calls to cryptographic functions that fall into the management and operational categories are recorded in the tracing file.

During the recording step, the modalities of call that are recorded in the tracing file may include the following information:

- optionally, call time-stamp information;
- the name of the cryptographic function called;
- the arguments of the function;
- the name of the module calling this function;
- the response returned by the function.

When an argument of the function, the response returned by the function or, more generally, one of the modalities of call to the cryptographic function is a data pointer, the data designated by this pointer is accessed to record the pointed data in the tracing file rather than the pointer itself. This file provides complete and useful information that can be used at a later date.

The information just listed is generally accessible in the execution stack associated with the program tested. A representation of this execution stack, called a call trace, can be obtained using functions available in the computer system, for example, in the form of an operating system service or a library function. The tracing program and/or the instrumentalization of the cryptographic functions therefore uses such a service or function to access the call trace and record in the tracing file information relating to the modalities of call to the cryptographic functions. In other words, the recording step includes obtaining at least a part of the execution stack (or a representation thereof) when the cryptographic function is called by the program subject to the APP test.

This recording step is continued as long as the program under APP test is running in or on the computer system 1. This execution shall be carried out according to the most varied scenarios possible in order to make the best possible use of the program APP and to record in the tracing file multiple calls representative of the program operation in its environment of production.

Upon completion of this recording step S2, a tracing file is available listing all the calls to the relevant cryptographic functions, and their modalities, in the course of the execution of the program. This information is obtained without the program itself having been modified or instrumentalized in its executable form of production. Advantageously, it was obtained in the course of the "in situ" execution in an environment similar with or identical to the production environment, i.e., on the computer system 1, which the program is intended to run on. The information collected is therefore very representative of the normal and "natural" operation of this program. When the program APP queries a configuration file CFG to adjust its behavior to user-defined parameters, this setting is taken into account in the collection of information that takes place in the course of this recording step S2.

The method according to this disclosure takes advantage of the tracing file thus created to carry out its analysis and detect potential security flaws therein. More precisely, the method includes a third step S3, which is subsequent to the step of recording S2, of analyzing the information collected in the tracing file. This analysis can be performed using a rule base to detect the calls to the cryptographic functions that are likely to form a security flaw.

Thus, the method according to this disclosure can implement a software inference engine capable of detecting security flaws from a fact base, derived from the tracing file, and a rule base. The rule base is used to represent which fact or combination of facts forms a potential security flaw. The inference engine can run on the computer system 1 described above and used to establish the tracing file, but it can also run on another calculation device completely independently of this computer system 1.

According to a particular embodiment of this disclosure, this analysis step includes (or is preceded by) a first sub-step wherein the cryptographic objects in the tracing file that have been created or manipulated (as an argument or as a result of a function) in the course of the operation of the program, in the course of the recording step, are listed. These objects can be encryption keys, passwords, encrypted content or content to be encrypted.

In a second sub-step, subsequent to the first one, a data structure is created to link each listed cryptographic object to the operations performed on or from that object in the course of its execution. This may involve forming a table wherein the operations identified in the tracing file are associated with each cryptographic object, as well as the order of these operations, such as the creation of the object and the use thereof. In the course of this second sub-step, objects are also attached together when a cryptographic operation recorded in the tracing file has implemented these objects. This is the case, for example, when an encryption key (the first object) is used to encrypt a password (the second object).

The state of a cryptographic object can be defined as the pair formed by this object and the sequence of operations associated with this object at a time in the course of the execution of the program. A model of the state of the cryptographic objects is thus represented in the data structure, i.e., a model of the different states that this cryptographic object can take in the course of the natural execution of the program, and the transitions from one state to another that take place in the course of this execution.

The objects identified, their states and transitions between these states then form the facts that form the basis of the facts that feed the inference engine. Devising the data structure allows security flaws to be detected by taking into account the dynamics of the program execution, and the sequencing of the operations associated with the cryptographic objects. At least some of these flaws would not be detectable with known techniques that are limited to a simple "static analysis of a tracing file (i.e., without identifying the states of the manipulated objects) or the execution of the program in a debugging environment.

As an illustration, and to fully understand the value of this approach, it is well known that using the same cryptographic key in a first signature step and in a second encryption step can form a security flaw. A static analysis of the tracing file, i.e., an analysis that does not identify, in the data structure, each cryptographic object and the operations performed on or from that object in the course of its execution, does not identify this type of flaw. Devising a model of a state of the cryptographic object implemented in this disclosure addresses this deficiency in state-of-the-art solutions.

Each rule in the rule base can be defined by one or more premise(s), seeking to qualify a fact (i.e., a cryptographic object, a state of that object or a transition between two states), and by a conclusion that can be derived from the premises, this conclusion allowing to detect a potential flaw, its nature and/or its degree of relevance.

For example, a particularly simple rule composed of a single premise may correspond to the following rule: if the length of an encryption key is less than 16, then detect a potential level three flaw called "encryption key too short."

As a complementary example, a more complex rule composed of a plurality of premises can be expressed as follows: If an encryption key has been used for an encryption step; and if the same encryption key is used for a signature step, then detect a potential level one security flaw called "signature encryption."

The rule base can be built from several sources. This may include, for example, incorporating recommendations or good practices associated with the use of a function or library of functions in the form of inference rules. The rule base is upgradable, it can be supplemented as the library usage rules are updated, to take into account the discovery of potential new flaws.

As such, the rule base used may be different depending on the nature of the function library that is deployed in the computer system, or depending on the version of that library. Thus, according to a particularly advantageous aspect, a method according to this disclosure includes the recording, for example, in the tracing file or in a separate working file, of the version number of the cryptographic function or the library of cryptographic functions. This recording can be done before or after the recording step. The rule base used in the analysis step can be chosen from a plurality of rule bases, depending on the version number. Alternatively, this version number may be a fact of which a rule of the type can be applied to: if the version is equal to 1.0 and a key is initialized to 0 then detect a potential level one security flaw and called "dangerous initialization."

In the course of the analysis step, the rules of the rule base are systematically applied to the facts and combinations of facts that form the fact base. Upon completion of this step, a list of potential flaws is obtained.

Analyzing the data structure may be considered using means other than the application of a rule base, particularly when verifying that the cryptographic functions of libraries are working properly. This allows the analysis of the results returned by these cryptographic functions, recorded in the tracing file. For example, all the values returned by a random number generator can be identified in the data structure, this generator being called by known functions of the library, to ensure the randomness of these values. These values can be considered as cryptographic objects, and integrated into the data structure of the states, as described above.

According to a preferred embodiment of the method of this disclosure, the third step of analysis S3 is followed, or includes, a step of filtering S4 the detected potential flaws.

This filtering step is intended to limit the issuance of false positive alarms. It can be based on a pre-established (and configurable) list of exceptions in order to eliminate from the list of potential flaws detected by the rule base those listed in the list of exceptions.

Of course, this disclosure is not limited to the described embodiments and alternative solutions can be used without departing from the scope of this disclosure as defined in the claims.

What is claimed is:

1. A non-intrusive method for detecting security flaws in a computer program, the method comprising:

installing and executing an executable and non-instrumentalized version of the program in a computer system, the computer system comprising at least one cryptographic function able to be called by the program to manipulate at least one cryptographic object, the at least one cryptographic function not included in the executable and non-instrumentalized version of the program;

instrumentalizing the at least one cryptographic function before executing the executable and non-instrumentalized version of the program to allow recording of modalities of calls to the at least one cryptographic function from the executable and non-instrumentalized version of the program; and in a course of execution of the program, recording in a tracing file modalities of calls to the at least one cryptographic function.

2. The method of claim 1, wherein recording in the tracing file comprises running a tracing program concurrently with the computer program to record in the tracing file.

3. The method of claim 1, further comprising replacing an original cryptographic function of the computer system with an instrumentalized cryptographic function.

4. The method of claim 1, wherein recording in the tracing file comprises obtaining at least a portion of an execution stack when the at least one cryptographic function is called by the program.

5. The method of claim 1, wherein:

the computer system includes a plurality of cryptographic functions; and wherein recording in the tracing file comprises recording only the modalities of calls to cryptographic-management and usage functions of the at least one cryptographic function in the tracing file.

6. The method of claim 1, wherein recording the modalities of calls to the at least one cryptographic function in the tracing file comprises recording at least one of the modalities of calls selected from the group consisting of a name of the at least one cryptographic function, arguments of the at least one cryptographic function, the name of a module calling the at least one cryptographic function, a time-stamping of the call to the at least one cryptographic function, and a response returned by the at least one cryptographic function in the tracing file.

7. The method of claim 1, wherein recording the modalities of calls to the at least one cryptographic function in the tracing file comprises recording a data pointer in the tracing file and accessing data designated by the data pointer to record the data designated by the data pointer in the tracing file.

8. The method of claim 1, further comprising implementing an inference engine configured to detect security flaws.

9. The method of claim 1, further comprising recording a version number of the at least one cryptographic function.

10. The method of claim 1, further comprising filtering a detected security flaw.

11. A computer program product comprising a computer-readable storage device storing instructions that, when the instructions are executed on a computing device, cause the computing device to perform a non-intrusive method of detecting security flaws of a computer program, the instructions comprising:

an execution function configured to execute an executable and non-instrumentalized version of the program in a computer system, the computer system comprising at least one cryptographic function able to be called by the program to manipulate at least one cryptographic object, the at least one cryptographic function not included in the executable and non-instrumentalized version of the program;

an instrumentalizing function configured to instrumentalize the at least one cryptographic function before executing the executable and non-instrumentalized version of the program to allow recording of modalities of calls to the at least one cryptographic function from the executable and non-instrumentalized version of the program; and a recording function that, in a course of execution of the program, is configured to record in a tracing file modalities of calls to the at least one cryptographic function.

12. The computer program product of claim 11, wherein the recording function of the instructions stored on the computer-readable storage device is configured to record at least one of the modalities of calls selected from the group consisting of a name of the at least one cryptographic function, arguments of the at least one cryptographic function, the name of a module calling the at least one cryptographic function, a time-stamping of the call to the at least one cryptographic function, and a response returned by the at least one cryptographic function in the tracing file.

13. The computer program product of claim 11, wherein the recording function of the instructions stored on the computer-readable storage device is configured to record a data pointer in the tracing file and access data designated by the data pointer to record the data designated by the data pointer in the tracing file.

14. The computer program product of claim 11, wherein an analysis function of the instructions stored on the computer-readable storage device is configured to implement an inference engine configured to detect security flaws.

15. The computer program product of claim 11, wherein a recording function of the instructions stored on the computer-readable storage device is configured to record a version number of the at least one cryptographic function.

16. A data processing system comprising:

one or more computers; and one or more storage devices communicatively coupled to the one or more computers, wherein the one or more storage devices store instructions that, when executed by the one or more computers, cause the one or more computers to perform operations for non-intrusive detection of security flaws in a computer program, the operations comprising:

installing and executing an executable and non-instrumentalized version of the program in a computer system, the computer system comprising at least one cryptographic function able to be called by the program to manipulate at least one cryptographic object, the at least one cryptographic function not included in the executable and non-instrumentalized version of the program;

instrumentalizing the at least one cryptographic function before executing the executable and non-instrumentalized version of the program to allow recording of modalities of calls to the at least one cryptographic function from the executable and non-instrumentalized version of the program; and in a course of execution of the program, recording in a tracing file modalities of calls to the at least one cryptographic function.

17. The data processing system of claim 16, wherein recording in the tracing file comprises running a tracing program concurrently with the computer program to record in the tracing file.

18. The data processing system of claim 16, wherein the operations further comprise replacing an original cryptographic function of the computer system with an instrumentalized cryptographic function.

19. The data processing system of claim 16, wherein recording in the tracing file comprises obtaining at least a portion of an execution stack when the at least one cryptographic function is called by the program.

20. The data processing system of claim 16, wherein:

the computer system includes a plurality of cryptographic functions; and wherein recording in the tracing file comprises recording only the modalities of calls to cryptographic-management and usage functions of the at least one cryptographic function in the tracing file.

* * * * *